United States Patent [19]

Fletcher et al.

[11] 4,062,245
[45] Dec. 13, 1977

[54] MOTION RESTRAINING DEVICE

[76] Inventors: James C. Fletcher, Administrator of the National Aeronautics and Space Administration, with respect to an invention of; Allen G. Ford, Pasadena, Calif.

[21] Appl. No.: 572,990

[22] Filed: Apr. 30, 1975

[51] Int. Cl.[2] .............................................. F16H 21/40
[52] U.S. Cl. .......................................... 74/81; 74/83; 185/38
[58] Field of Search ................... 74/89.1, 64, 70–75, 74/76–81, 83; 185/38

[56] References Cited

U.S. PATENT DOCUMENTS

| 274,094 | 3/1883 | Miller | 74/75 |
|---|---|---|---|
| 876,449 | 1/1908 | Fry | 74/75 |
| 1,185,573 | 5/1916 | Aldrich | 74/89.1 |
| 1,350,106 | 8/1920 | Martinoicz | 74/64 |
| 3,796,104 | 3/1974 | Templeton | 74/70 |

FOREIGN PATENT DOCUMENTS

| 622,997 | 3/1927 | France | 74/64 |
|---|---|---|---|
| 349,091 | 2/1937 | Italy | 74/70 |

Primary Examiner—Samuel Scott
Assistant Examiner—Wesley S. Ratliff, Jr.
Attorney, Agent, or Firm—Monte F. Mott; Wilfred Grifka; John R. Manning

[57] ABSTRACT

A motion-restraining device for dissipating at a controlled rate the force of a moving body. The device is characterized by a drive shaft adapted to be driven in rotation by a moving body connected thereto through a tape wound about a reel mounted on the drive shaft, oscillatable mass, a crankshaft connected with the drive shaft, and an elongated pitman link having one end pivotally connected to the crankshaft and the opposite end thereof connected with the mass through an energy dissipating linkage including a shuttle disposed within a slot and guided thereby for rectilinear motion between a pair of spaced impact surfaces so configured that reaction forces applied at impact of the shuttle with the impact surfaces include oppositely projected force components angularly related to the direction of the applied impact forces, whereby a cancellation of components of reaction forces is achieved.

5 Claims, 10 Drawing Figures

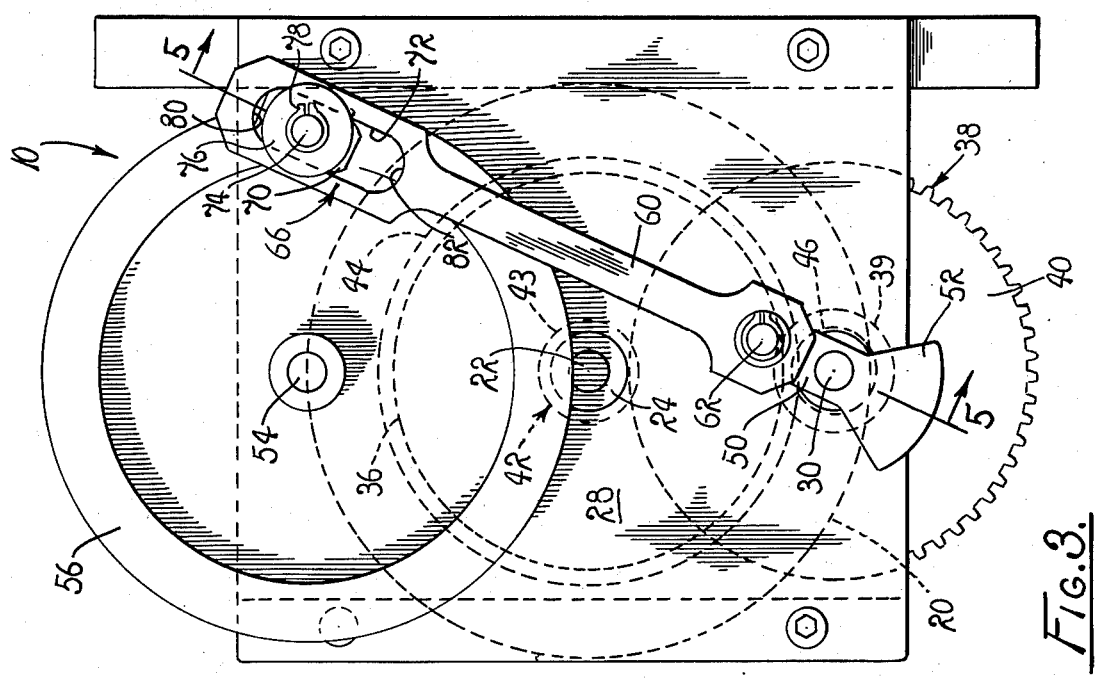
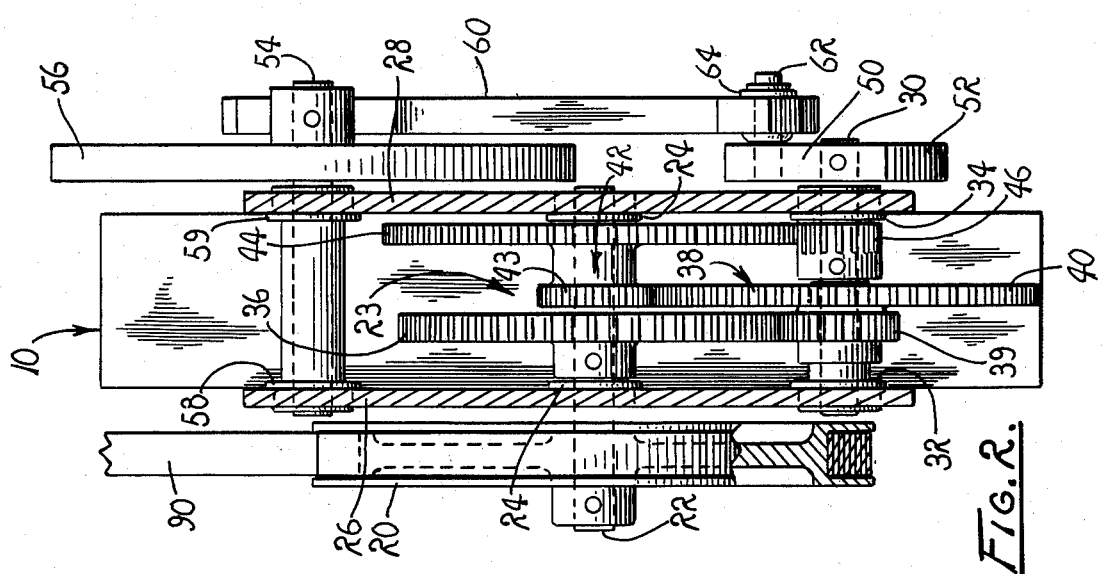
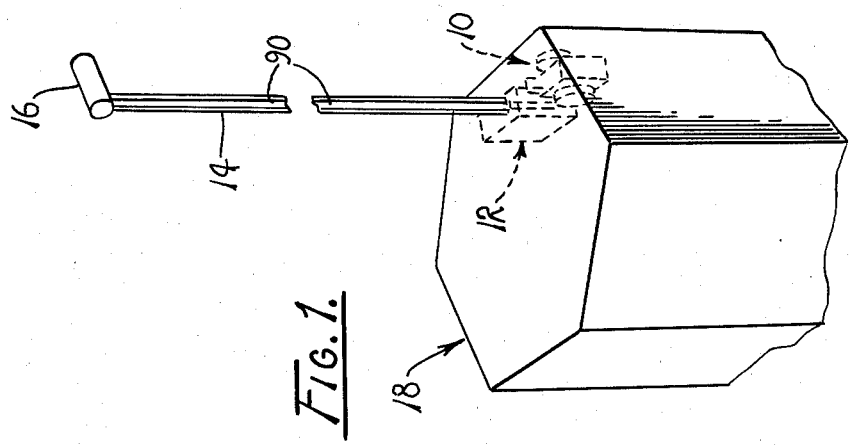

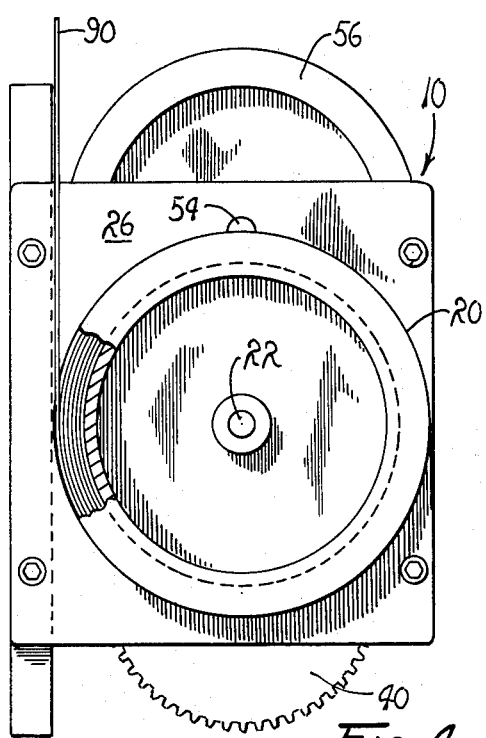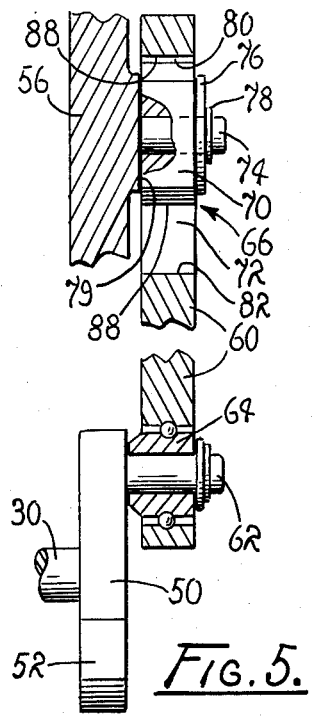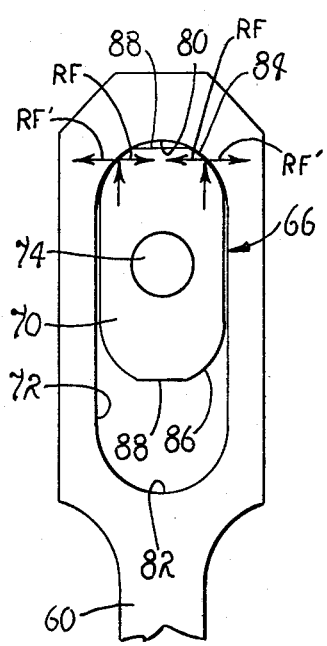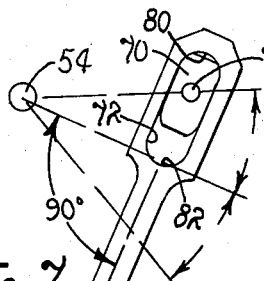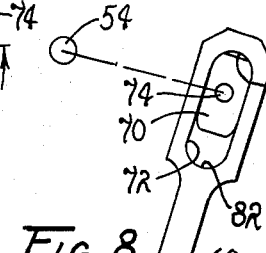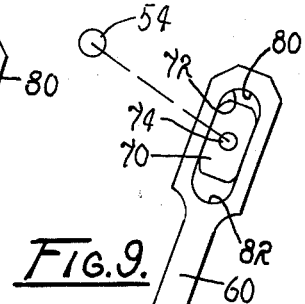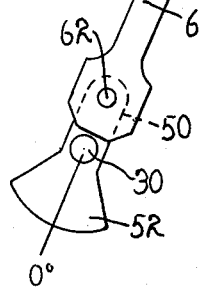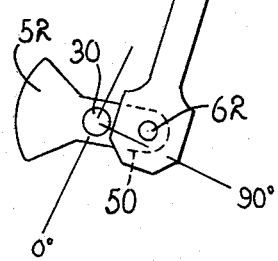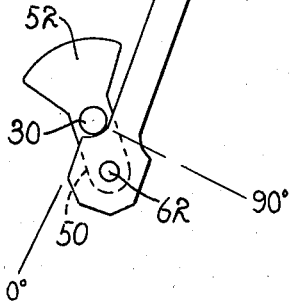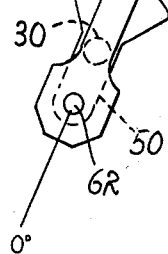

MOTION RESTRAINING DEVICE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention generally relates to motion-restraining devices and more particularly to an improved motion-restraining device for dissipating at a controlled rate the force of a body moving unidirectionally, such as the spring-loaded mass as the mass is deployed from an operational spacecraft.

As can readily be appreciated by those familiar with the aerospace industry, it often is desirable to provide aboard spacecraft booms and truss-like structures adapted to be collapsed into a launch configuration and thereafter extended into a deployed configuration, for deploying science payloads, once the spacecraft becomes operational. In order to achieve this result, it has been suggested that collapsible, spring-loaded booms be provided. Of course, release of the spring-loaded booms without restraint tends to apply turning moments to the spacecraft from which the boom is extended. Such moments can, in operation, exceed the control capabilities of attitude control systems provided therefor so that serious navigational problems are thus introduced. It is therefore desirable to deploy the booms at relatively slow rates in order to dissipate the released energy over relatively long periods of time.

2. Description of the Prior Art

Among the devices heretofore employed for purposes of dissipating the energy of moving bodies, at controlled rates, are those which utilize escapement mechanisms such as those often employed in the field of horology. Such mechanisms commonly utilize an escape wheel and a two-arm pallet which dissipate energy by converting it into heat at the impact of the pallet with the escape wheel. However, it has been found that such devices simply are not suitable for use in controlling the deployment of spring-loaded booms from operational spacecraft. For example, in order to accommodate swing clearance for the impact members of a two-arm pallet either a relatively small radius on the escape wheel or a small radius on each arm of the pallet must be provided. Because of this design requirement, essentially line contact can be expected to occur between the impacting surfaces with an attendant brinelling at the point of impact. This result can, of course, result in malfunction of the escapement mechanism with attendant abortion of the spacecraft's mission.

While it has been suggested that brinelling can be obviated either by changing the slope of the escape teeth or by employing harder materials, it is apparent that a greater slope tends to decrease the decelerating force undesirably. Moreover, the coefficient of restitution of harder materials would tend to return energy to the system, instead of dissipating it. Additionally, escapement geometry of the prior art devices limits oscillation of a pallet to approximately 5° which requires either that a high oscillation frequency be provided or that a high inertia flywheel be utilized or both. Furthermore, tangential shock is introduced into the driving gear system of conventional escapement devices at each tooth engagement.

In view of the foregoing, it should be apparent that there exists a need for an improved motion-restraining device adapted to be employed aboard operative spacecraft for purposes of controlling the rates at which spring-loaded booms are deployed. It is therefore the general purpose of the instant invention to provide a motion-restraining device for use aboard spacecraft which overcomes the aforementioned difficulties and disadvantages without impairing the advantages achievable through the use of actuating devices for extending collapsible booms and truss-like structures.

OBJECTS AND SUMMARY OF THE INVENTION

It is, therefore, an object of the instant invention to provide an improved motion-restraining device which overcomes the aforementioned difficulties and disadvantages.

It is another object to provide a motion-restraining device particularly suited for use aboard spacecraft in controlling the rate at which a spring-loaded boom is deployed.

Another object is to provide an improved motion-restraining device for dissipating at a controlled rate the force of a body moving unidirectionally having particular utility in connection with the deployment from operative spacecraft of spring-loaded booms, although not necessarily restricted thereto, since the device of the instant invention has utility when connected with moving linkages and bodies, such as spring-loaded devices employed in terrestrial environments.

These together with other objects and advantages are achieved through a motion-restraining device including a drive shaft adapted to be driven in rotation by a moving body connected thereto through a tape-and-reel coupling, a crankshaft connected in driven relation with the drive shaft, and an energy dissipating mass supported for angular displacement connected to the crankshaft through lost-motion linkage and responsive to rotary motion imparted to the drive shaft for dissipating energy; said lost-motion linkage being characterized by a shuttle supported for rectilinear translation into alternate impacting engagement with a pair of mutually spaced impact surfaces so configured that reaction forces at impact include oppositely directed force components angularly related to the direction of the impact force applied by the shuttle, as will hereinafter become more readily apparent by reference to the following description and claims in light of the accompanying drawings.

BRIEF DESCRIPTION OF THE DRAWINGS

FIG. 1 is a diagrammatic view depicting an operational environment for a motion-restraining device which embodies the principles of the instant invention.

FIG. 2 is a cross-sectional view of the motion-restraining device shown in FIG. 1.

FIG. 3 is an end view of the motion-restraining device, particularly illustrating the interrelationship of a crankshaft, a pitman link and an oscillatable flywheel which serves as a force-dissipating mass.

FIG. 4 is an end view of the device, taken in a direction opposite to the direction in which FIG. 3 is taken.

FIG. 5 is a fragmented cross-sectional view taken generally along line 5—5 of FIG. 3, illustrating a lost-motion linkage, including a shuttle, through which the crankshaft is connected with the flywheel.

FIG. 6 is a fragmented elevational view of a shuttle employed by the device of the instant invention, illustrating the dissipation of reaction force components.

FIGS. 7 through 10, collectively, illustrate the extent of angular motion imparted to the flywheel in response to 180° of rotation imparted to the crankshaft.

DESCRIPTION OF THE PREFERRED EMBODIMENT

Referring now to the drawings, with more particularity, wherein like reference characters designate like or corresponding parts throughout the several views, there is shown in FIG. 1 a motion-restraining device, generally designated 10, which embodies the principles of the instant invention.

As illustrated in the drawings, the motion-restraining device 10 is interconnected with a pay-out mechanism, generally designated 12, which serves to extend a collapsible boom 14. As shown, the boom 14 comprises a spring-loaded boom having supported at its destal end a science payload 16 and is projected from a spacecraft, generally designated 18, schematically illustrated in the drawings. It will, of course, be appreciated that the motion-restraining device 10 is employable in any environment wherein it is desirable to impose restraint on a body moving substantially unidirectionally.

The motion-restraining device 10 includes a reel 20 mounted on a drive shaft 22 for a drive train, generally designated 23. In practice, the drive shaft 22 is supported by suitable coaxially aligned bearings 24. These bearings are supported by a pair of interconnected support plates 26 and 28 arranged in spaced parallelism. It is important to note that the reel 20 is rigidly connected to the drive shaft 22 through a pin, not designated. It is to be understood, of course, that splines and the like can be employed equally as well for this purpose, and that angular displacement of the reel 20 serves to impart driven rotation to the drive shaft 22.

In spaced relation with the drive shaft 22, there is disposed a crankshaft 30 supported for rotation about an axis paralleling the axis of the drive shaft by a pair of coaxially aligned bearings 32 and 34. These bearings are received in suitable openings, not designated, formed in the support plates 26 and 28 and are of any suitable design.

Affixed to the drive shaft 22, in juxtaposition with the bearing 24, there is a spur gear 36. Mounted on the crankshaft 30, is meshed relation with the spur gear 36, there is a compound gear 38 supported in free-running relationship with the crankshaft 30. The compound gear 38 includes a minor gear component 39, meshed with the spur gear 36, and a major gear component 40. Also mounted on the drive shaft 22, in a free-running relationship therewith, is another compound gear 42. This gear includes a minor gear component 43, meshed with the major gear component 40 of the compound gear 38, and a major gear component 44. The major gear component 44 of the compound gear 42 is, in turn, meshed with a driving gear 46, of a diameter substantially smaller than the diameter of the gear component 44, and is rigidly affixed to a crankshaft 30. It should be apparent that due to the differences in the diameters of the various gears and gear components, aforementioned, the driving gear 46 serves to impart rotation to the crankshaft 30 at a rate substantially greater than the rate at which the drive shaft 22 is driven in rotation by the reel 20. For example, in practice, the spur gear 36, and the compound gears 38 and 42 collectively function as a three-stage gear train which serves to multiply the angular displacement of the reel 20 by a factor of 88.

On one end portion of the crankshaft 30, opposite the end thereof adjacent to the reel 20, there is rigidly affixed a crank arm 50. As a practical matter, the crank arm 50 includes a counterweight 52.

Also supported by the plates 26 and 28 there is an axle 54 upon which is mounted a flywheel 56. While the flywheel 56, as shown, is pinned to the axle 54, the flywheel is, when desired, supported by the axle 54 for free-running rotation relative thereto. As shown, in order to accommodate a free-running rotation of the axle 54, a pair of coaxially aligned bearings 58 and 59 is mounted on the plates 26 and 28, respectively and concentrically receives the axle. Therefore, it is to be understood that the flywheel 56 comprises a mass supported for oscillation about an axis coincident with the axis of the axle 54.

In order to impart oscillatory motion to the flywheel 56, there is provided a pitman link 60, having its base end connected with the distal end of the crank arm 50 through a crank pin 62. As shown, the crank pin 62 is rigidly affixed to the crank arm 50 and is received within a bearing 64 provided in the base end of the pitman link 60 so that rotary motion of the crank pin 62 relative to the pitman link 60 is accommodated.

The opposite end of the pitman link 60 is connected with the flywheel 56 through lost-motion linkage, generally designated 66, through which oscillatory motion is imparted to the flywheel 56 as rotary motion is imparted to the crankshaft 30. As best illustrated in FIGS. 7 through 10, the throw of the flywheel 56 is 47° 10'. Thus, the lost-motion linkage 66 never achieves an aligned relationship with the crankshaft 30 and the axle 54. Thus, over-center stall is avoided.

The lost-motion linkage 66 also functions as an energy dissipating linkage through which energy is dissipated as reaction forces are, in part, cancelled at impact due to components of the reaction forces being caused to act in opposititión, as illustrated in FIG. 6.

In order to achieve the desired energy dissipation at impact, and a cancellation effect for reaction forces, the lost-motion linkage 66 is provided with a shuttle 70. The shuttle is supported for rectilinear translation in an elongated slot 72 formed in the distal end portion of the pitman link 60. Where desired, the shuttle 70 is pinned to the flywheel 56 by a crank pin 74 rigidly affixed to the flywheel and received in a bearing sleeve, not designated, provided in the shuttle. A keeper, including a washer 76 and snap ring 78, is provided for securing the shuttle 70 in a mated relationship with the slot 72, as best illustrated in FIG. 3. If desired, a suitable land 79, FIG. 5, is formed on the face of flywheel 56 and serves as a bearing surface for the pitman link 60 as the shuttle 70 moves in translation relative to the slot 72.

It is important to note that the opposite ends of the slot 72 are defined by a pair of curved surfaces, designated 80 and 82, which form impact surfaces for the shuttle 70. The radii of the curved surfaces 80 and 82 extend from a point lying along the longitudinal axis of symmetry of the pitman link 60 so that, in effect, the surfaces 80 and 82 are arranged in opposed alignment with the shuttle 70 being supported for translation therebetween.

The shuttle 70 is of a substantially elongated configuration and includes a pair of truncated curved surfaces 84 and 86 which serve as end surfaces for the shuttle. It is to be understood that the radii of the end surfaces 84 and 86 are substantially equal to the radii of the opposed impact surfaces 80 and 82. However, each of the end surfaces is truncated along a chord so as to provide a truncated surface segment 88 extended in orthogonal relation with the longitudinal axis of the shuttle.

By truncating the end surfaces 84 and 86, the shuttle 70 is permitted to impact at the impacting surfaces 80 and 82 without impacting engagement occurring near the center portions of the impact surfaces. Thus, the impact forces, as best illustrated in FIG. 6, are applied at curved surfaces located at opposite sides of the longitudinal axis of symmetry of the pitman link 60, and the shuttle 70. Consequently, components of the reaction forces, designated RF and RF', are applied in paired opposition, at impact, and thus these forces tend to cancel each other. Of course, impact is attended by conversion of energy to heat.

As illustrated, the motion-restraining device 10 is connected with the flexible boom 14 through a tape 90 wound about the reel 20 and affixed to the boom in a manner such that as the boom is paid out the tape 90 is tensioned. Where so desired, the reel 20 can be employed as an input for motion derived from bodies moving in other than linear directions.

OPERATION

It is believed that in view of the foregoing description, the operation of the device will readily be understood and it will be briefly reviewed at this point.

With the motion-restraining device 10 assembled in the manner hereinbefore described and connected with a body, such as a spring-loaded boom 14, supported aboard a spacecraft in a launch configuration, the device is prepared for operation, subsequent to launching of the spacecraft.

The boom 14 is released to be paid out in response to command signals acquired from a ground station, not shown. As the boom is paid out, the tape 90 connected thereto is placed in tension so that a force is applied to the reel 20 tangentially. Consequently, the reel 20 is angularly displaced in response to the tensioning of the tape 90. An angular displacement of the reel 20 occurs, rotary motion is responsively imparted to the drive shaft 22, whereupon the spur gear 36 is caused to rotate for driving the enmeshed first gear component 39 of the compound gear 38, for thereby imparting thereto rotary motion about the crankshaft 30.

As rotary motion is thus imparted to the compound gear 38, the compound gear 42 is driven in rotation due to the meshed relationship of the gear component 40 of the compound gear 38 and the gear component 43 of the compound gear 42. As the compound gear 42 is driven in rotation about the drive shaft 22, the gear component 44 serves to impart rotary motion to the crankshaft 30 about the axis thereof, via the gear 46. Thus, the crankshaft 30 is caused to rotate for thus imparting rotary motion to the crank arm 50. This motion is converted to substantially rectilinear motion by the pitman link 60 connected to the crank arm at the crank pin 62 which is driven in unidirectional angular displacement. This motion, in turn, is transmitted to the flywheel 56 via the lost-motion linkage 66, and converted to oscillatory motion.

It is noted, as best illustrated in FIG. 10, the throw of the flywheel is 47° 10', thus the flywheel is caused to oscillate rather than rotate about its own axis in response to oscillatory motion imparted to the pitman link. It will be appreciated that as the crankshaft 30 is driven through its first 90° of rotation, the flywheel 56 is accelerated through an angle equaling one-half of the throw of the flywheel, as the crankshaft 30 is driven through the next 90° of its rotation, the flywheel 56 is permitted to coast through the other one-half of its throw, due to the deceleration of the pitman link. Of course, as the pitment link is decelerated, the inertia of the flywheel 56 causes the flywheel to experience an over-running of the pitman link for thus causing the shuttle 70 to advance relative to the slot 72 and to ultimately impact against the curved surface 82 of the slot as the pitman link comes to rest. As the crankshaft 30 is caused to rotate through the next 90°, the flywheel 56 is accelerated in the opposite direction, and through the final 90° of rotation of the crankshaft, the flywheel 56 is permitted to experience a coasting and ultimate over-running of the pitman link whereupon the shuttle 70 is caused to impact against the curved surfaces 80. As the shuttle is caused to impact, cancellation of opposed reaction force components occurs. Moreover, it is to be understood that the curved surfaces of the shuttle impact at each of the opposite ends of the slot 72, against the curved surfaces 80 and 82, for effecting cancellation of opposed reaction force components.

In view of the foregoing, it should be readily apparent that the motion-restraining device of the instant invention provides a practical solution to the problem of dissipating, at a controlled rate, the force of a body moving along a linear path.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. In a motion-restraining device for dissipating at a controlled rate the force of a body moving unidirectionally, the improvement comprising:
    force dissipating means for dissipating rotary motion including:
    A. a crankshaft adapted to be driven in unidirectional rotation and having an angularly related crank arm,
    B. a mass supported for oscillatory motion about a fixed axis of rotation,
    C. an elongated pitman link having one end pivotally connected to said crank arm, and
    D. energy dissipating means interconnecting the opposite end of said link with said mass including means defining in said link an elongated slot, the opposite ends of which are defined by a pair of impact surfaces, a shuttle seated in said slot and supported thereby for rectilinear motion between said impact surfaces including a pair of opposite end surfaces of a truncated, curved configuration, the radii of curvature for said end surfaces being extended from points spaced at equidistances from the opposite end of the shuttle along an axis of symmetry therefor and the planes of truncation for said end surfaces being extended orthogonally with respect to said axis, and means for pivotally connecting said shuttle to said mass.

2. The improvement of claim 1 wherein said pair of impacting surfaces are of uniformly curved configurations, each having a radius substantially equal to the radii of the end surfaces of said shuttle and extended from a point located along the longitudinal axis of said link.

3. A motion-restraining device for dissipating at a controlled rate the force of a body moving unidirectionally comprising:
- A. a crankshaft including a crank arm supported to be driven in unidirectional rotation;
- B. torque applicator means connected in driving relation with said crankshaft and adapted to be connected with a moving body the motion of which is to be restrained for imparting unidirectional rotation to said shaft in response to the motion of the body; and
- C. a force dissipating means including a mass supported for oscillatory motion about a fixed axis, an elongated pitman link pivotally connected to said crank arm and including a pair of opposed impact surfaces, energy dissipating means including a shuttle pivotally connected to said mass and coupled in a sliding relationship with said link and guided thereby for rectilinear motion along a path having an axis coincident with the longitudinal axis of said link and extended between the pair of opposed impact surfaces.

4. The device of claim 3 wherein said torque applicator includes a drive shaft, drive means for imparting rotary motion to said drive shaft, and means including a multistage gear-train interposed between said drive shaft and said crankshaft and interconnected therewith for driving the crankshaft at a rate greater than the rate at which the drive shaft is driven.

5. The device of claim 4 wherein said force dissipating means further includes means for guiding said shuttle including a slot extended between said impact surfaces.

* * * * *